Feb. 20, 1962 W. H. DAILEY, JR 3,022,056
COMBUSTION CONTROLS FOR METALLURGICAL HEATING FURNACES
Filed Nov. 29, 1957
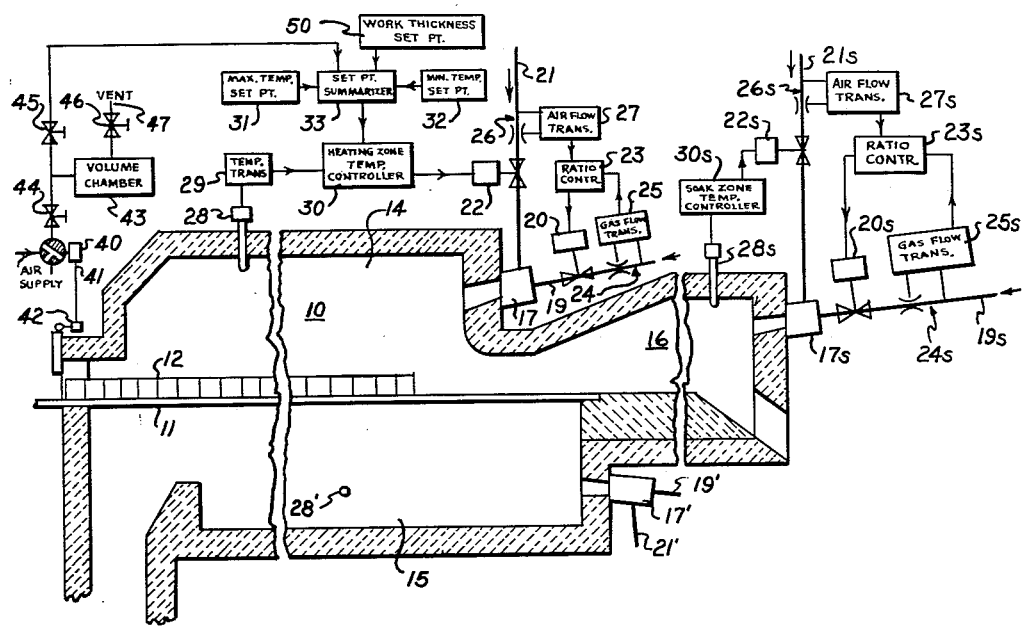
INVENTOR.
WILLIAM H. DAILEY, JR.
BY Charles P. Haughey
his atty.

United States Patent Office
3,022,056
Patented Feb. 20, 1962

3,022,056
COMBUSTION CONTROLS FOR METALLURGICAL HEATING FURNACES
William H. Dailey, Jr., Toledo, Ohio, assignor, by mesne assignments, to Midland-Ross Corporation, Cleveland, Ohio, a corporation of Ohio
Filed Nov. 29, 1957, Ser. No. 699,570
5 Claims. (Cl. 263—6)

The present invention relates to metallurgical furnaces for heating ingots, billets, blooms, slabs and the like preparatory to plastic deformation by rolling, forging, etc., and particularly to improved methods and systems for controlling rate of heat input in fuel-fired furnaces having a plurality of heating zones.

In the operation of "slab heaters," exemplary of the type used for heating slabs, billets or the like, it is desirable that the regulation of the supply of heat be maintained in a manner to prevent overheating, particularly during periods of reduced production rates.

In the present practice of heating slabs it is customary to pass the work through one or more main heating zones where it is rapidly elevated to a predetermined temperature and subsequently pass the work through a soaking zone, which serves as a holding or stabilizing medium, immediately before discharge.

In high speed slab heaters operating with production rates of the order of 300#/hr. per sq. ft. of projected slab area, the fuel flow to the soaking zone is a measure of the total heat demand on the furnace. As the slabs, or work approach the soaking zone their outside temperature is approximately the same, both for high and low firing rates (and corresponding high and low production rates). The interior of the slabs, however, becomes progressively cooler as the production, hence firing, rate increases, thus affecting the heat input necessary in the soaking zone.

In order to achieve maximum production from a slab heating furnace, heretofore, it has been the normal practice for the furnace operators to manually increase the temperatures in the main heating zones during periods of high load demand. On subsequent production slowdown, it is necessary to reduce the control temperature in the main heating zones to avoid overheating the slabs. Effective manual control of the temperature in the main heating zones is not only contingent upon the operator's experience, but also upon his extreme attentiveness to conditions within the furnace. If the heat demand suddenly decreases, as occurs in production slowdown, without an appropriate cutback in temperatures, the work in the furnace can be severely damaged.

It is accordingly the principal object of this invention to provide improved method and apparatus for automatically controlling the rate of heat input to the main heating zones of a multiple zone heating furnace to suit the production requirements.

It is proposed to measure the heat demand by an integrating device which measures the rate at which work is being charged into the furnace and initiates a signal to a summarizing device which resets the temperature control points in the main heating zones to satisfy this rate. A device which measures the thickness and initiates a signal to the summarizing device in accordance with varying slab thickness to the temperature control points in the main heating zones may be added to this embodiment to provide a further compensating refinement for varying workload conditions.

The above embodiment is based upon maintaining a substantially constant temperature head or furnace wall temperature in the soaking zone even though production rates and firing rates vary.

For a consideration of what I believe to be novel and my invention, attention is directed to the following specification, the drawing and the concluding claims, in which other details, objects and advantages will become apparent.

In the drawing:

The single figure is a schematic representation of a longitudinal section of a slab heater furnace and controls in which the temperature control points in the main heating zones are capable of being reset in response to the rate at which work is being moved through the furnace and to the varying thickness of the work; and The numeral 10 designates the heating chamber of the furnace while the numeral 16 designates the "soaking" chamber or zone. The furnace is provided with skid rails 11 on which billets 12 or other work to be heated are supported with the furnace. When the furnace is filled with billets 12, the row of billets supported on the skid rails 11 separates the heating chamber into an upper heating zone 14 and a lower heating zone 15. Heat is supplied to the heating zones 14, 15 and the soaking zone 16 through burners 17, 17′ and 17s respectively.

The operation of the burners and the controls of the fuel and air supply for each set of burners are identical except for differences to be noted, and hence will be described only in connection with burner 17. Corresponding units are designated with similar numbers except that those operating in connection with burner 17s are provided with a suffix "s" for purposes of distinction. Those in connection with burner 17′ are not shown.

Fuel is delivered to burner 17 by supply pipe 19 having control valve 20, and the air is delivered by supply duct 21 having a control valve 22.

The ratio of air to fuel delivered to the burner 17 may be maintained during the varying rates of fuel supply (as necessitated by furnace operation) by any preferred ratio control means, which for purposes of illustration, has been shown as comprising air valve operating instrument 23 which in order to maintain volumetric proportions of the air and fuel is made responsive first, to changes in differential pressure in the fuel stream at metering orifice 24 and transmitted by fuel flow transmitter 25 and second, the changes in differential pressure in the air stream at metering orifice 26 and transmitted by air flow transmitter 27. The instrument 23 then actuates the fuel control valve 20.

In order to proportion the rate of flow of the fuel in accordance with deviation from the temperature control set point in the heating section 14 a thermocouple 28 is positioned therein and through pneumatic signal transmitter 29 operatively connected to the temperature control 30 controls the actuation of air control valve 22. (Transmitter 29 has been omitted in connection with burner 17s because it is unnecessary to convert the electrical impulse from the thermocouple 28s into a pneumatic one.) For convenience, the soaking zone thermocouple 28s has been shown near the discharge end; however, in practice the preferred position is intermediate the soaking zone. In operation, if the heating section or zone 14 is cold or contains a cold charge, a large deviation from normal in the temperature of the furnace zone registered by the thermocouple 28 will result in more fuel and air reaching the burner 17. As the air passes through the metering orifice 26, the ratio control instrument 23 will automatically introduce the correct amount of fuel into the burner 17.

The proportioning system thus far described is not new and is usually employed where a constant predetermined ratio of fuel to air is desired to be maintained.

The chief novelty of invention resides in providing means for adjusting the wall temperature in the primary heating zone of a furnace, having a plurality of heating zones, in accordance with the production rate of the furnace, while maintaining a substantially constant wall temperature in the soaking zone, and thereafter automatically regulating the fuel supply to the primary heating zone to maintain the adjusted primary heating zone wall temperature.

The control system of this invention is novel in that provision is made to automatically vary the temperature settings for the heating zone burners to suit the production rate. The maximum and minimum temperature settings for the burner 17 may be manually set by means of set point controls 31 and 32, respectively. The actual temperature setting will vary between these limits as required to maintain the optimum fuel input to the soaking zone, and set point controls 31 and 32 are operatively connected to the pneumatic set point summarizer 33. Means are accordingly provided for transmitting a signal, which is an accurate reflection of the production rate, to the set point summarizer in the form of a relay 33. The summarizer 33 in turn varies the temperature control point of temperature control 30 to suit this rate.

An approximation of the furnace load is the rate of pushing slabs through the furnace. This approximation may be used to reset the control set points of the main heating zones. In practice the furnace charge door is opened once for each slab being charged. Whenever the furnace charge door operator is actuated, a solenoid valve 40 may be energized through suitable linkage 41 and switch 42. The valve 40 is operatively connected to an air supply to furnish air to volume chamber 43 when energized. The volume chamber 43 is supplied with needle valves 44, 45 and 46 and vent 47, so that the rate at which the pressure in the volume chamber 43 varies with the actuation of solenoid 40 may be adjusted. The frequency of operation of the solenoid 40, which is a measure of billets being pushed, determines the pressure in the volume chamber 43. A high frequency of operation of the solenoid 40 will build up a high pressure in the volume chamber 43 while a low frequency of operation, such as during production shut-down, will permit the volume chamber pressure to bleed off through the vent 47. The pressure impulse from the volume chamber 43 is directed to the set point summarizer 33 to adjust the set point controller 30 according to the production rate.

It will be readily apparent that the above described device for measuring the rate of pushing slabs may be employed in connection with a discharge door (not shown) in the same manner as used with the charge door.

In those installations where production "runs" of various thicknesses are made, an additional compensating device in the form of a work thickness set point control 50 may be added to the system to influence the set point summarizer 33. Such control 50 may be manually preset before each production run having work of different thickness or may be operatively connected to automatic measuring means. Set point summarizer 33 is a pneumatic relay, well known in the art, which summarizes or adds the pneumatic signal from volume chamber 43, and the pneumatic signal from the work thickness set point 50; the resultant signal, which is sent to the heating zone temperature controller 30, can never exceed the signal established by the maximum temperature set point 31, nor can it be less than the signal established by the minimum temperature set point 32.

I have found that the fuel demand in the soaking zone of the type of furnace described, usually indicated by a spread between control point and actual temperature, is an accurate reflection of the rate of pushing slabs through the furnace. Upon a sudden reduction in demand, due to slow "pushing" or delays, the fuel demand in the soaking zone drops rapidly. On resumption of operation, "hot" billets will reach the soaking zone for a while. However, as the colder slabs, those which were nearest the charging end, approach the soaking zone, the heat radiating to them from the furnace walls will immediately reduce the soaking zone wall temperature. This reduced temperature head will increase the fuel demand in the soaking zone. In the illustrated embodiment, as this fuel demand approaches an optimum rate an impulse could be sent to the summarizer 33 from fuel flow transmitter 25s to automatically increase the setting of control 30 within the preset limits, thereby increasing the heat input to the main heating zones 14 and 15, so that the billets will advance to the soaking zone at the correct temperature and maintain an optimum firing rate in the soaking zone; in this case the signals from volume chamber 43 and work thickness set point 50 to summarizer 33 would be eliminated.

It should be clearly understood that it is not proposed to regulate the actual fuel input to the main heating zones in proportion to the fuel demand in the soaking zone. The fuel input is regulated independently for each zone as required to maintain the preselected temperature. The impulse from the soaking zone fuel transmitter would preselect the temperature control point, between the maximum and minimum limits, in each of the main heating zones. For example, it is anticipated that on a long delay between work advances, the temperature of the upper main heating zone 14 and the bottom main heating zone 15 will probably be reduced to 2300° F. and 2350° F. respectively, while the soaking zone temperature will be maintained at approximately 2400° F.

As will be evident to those skilled in the art, various modifications and alternatives can be made in the light of the foregoing disclosures without departing from the spirit or scope of the disclosure or of the claims.

Having disclosed my invention, I claim:

1. A system for controlling the operation of a furnace through which work is moved, said furnace having wall means forming a primary heating zone and a soaking zone, and having first and second burner means for the primary heating zone and soaking zone respectively to which gaseous mixtures are supplied, comprising, in combination: first and second conduits through which fuel and air, respectively, are supplied to said first burner means; first and second valve means in said first and second conduit means respectively; first temperature responsive control means for controlling one of the first and second valve means to maintain a first set point temperature in said heating zone; flow measuring means for measuring the flow in each of said first and second conduits; ratio control means responsive to the flow through said first and second conduits to adjust the other of said first and second valve means not controlled by said first temperature responsive means to maintain flow through said first and second conduits in fixed relationship to each other; means for varying the first temperature set point in response to the rate at which work is moved through the furnace; third and fourth conduit means through which fuel and air, respectively, are supplied to said second burner means; third and fourth valve means in said third and fourth conduit means respectively; second temperature responsive control means for controlling one of the third and fourth valve means to maintain a substantially constant second set point temperature in said soaking zone; flow measuring means for measuring the flow in each of said third and fourth conduits; and ratio control means responsive to the flow through said third and fourth conduits to adjust the other of said third and fourth valve means not controlled by said second temperature responsive means to maintain flow through said third and fourth conduits in fixed relationship to each other.

2. The system as described in claim 1 in which the means for varying the first temperature set point index comprises a set point summarizing relay responsive to the rate at which work is being charged into the furnace.

3. The system as described in claim 1 in which the means for varying the first temperature set point comprises a set point summarizing relay responsive to the rate at which work is moved through the furnace and responsive to a maximum and minimum temperature set point index operatively connected to said relay, whereby the first temperature set point is varied between a maximum and minimum temperature set point in response to the rate at which work is moved through the furnace.

4. The system as described in claim 3 wherein the set point summarizing relay is further responsive to the thickness of the work being moved through the furnace.

5. A system for controlling the operation of a furnace through which work is moved, said furnace having wall means forming a primary heating zone and a soaking zone, and having first and second means for supplying heat to said primary heating zone and said soaking zone respectively, comprising, in combination: first control means having a first temperature set point, said first control means being operatively connected to said first heat supplying means to maintain the temperature of said primary heating zone substantially equal to the value of said first temperature set point; means operatively connected to said first control means for varying the first temperature set point in response to the rate at which work is moved through the furnace; and second control means having a second temperature set point, said second control means being operatively connected to said second heat supplying means to maintain the temperature of said soaking zone substantially constant and equal to the value of said second temperature set point.

References Cited in the file of this patent

UNITED STATES PATENTS

| | | | |
|---|---|---|---|
| 2,296,255 | Bloom | Sept. 22, | 1942 |
| 2,296,256 | Bloom | Sept. 22, | 1942 |
| 2,518,996 | Peckham | Aug. 15, | 1950 |
| 2,620,174 | Passafaro | Dec. 2, | 1952 |
| 2,668,700 | Zimmerman | Feb. 9, | 1954 |
| 2,668,701 | Dietrich | Feb. 9, | 1954 |
| 2,872,173 | Munker | Feb. 3, | 1959 |